United States Patent
Gintis

(10) Patent No.: US 9,552,309 B2
(45) Date of Patent: Jan. 24, 2017

(54) METHODS, SYSTEMS, AND COMPUTER READABLE MEDIA FOR PROVIDING PRECISE TIMING IN VIRTUAL DATA NETWORK OR STORAGE NETWORK TEST ENVIRONMENT

(71) Applicant: Ixia, Calabasas, CA (US)

(72) Inventor: Noah Gintis, Westlake Village, CA (US)

(73) Assignee: Ixia, Calabasas, CA (US)

(*) Notice: Subject to any disclaimer, the term of this patent is extended or adjusted under 35 U.S.C. 154(b) by 129 days.

(21) Appl. No.: 14/296,428

(22) Filed: Jun. 4, 2014

(65) Prior Publication Data
US 2015/0356031 A1    Dec. 10, 2015

(51) Int. Cl.
| G06F 3/00 | (2006.01) |
| G06F 13/10 | (2006.01) |
| G06F 9/455 | (2006.01) |
| G06F 1/12 | (2006.01) |
| G06F 11/00 | (2006.01) |

(52) U.S. Cl.
CPC .............. G06F 13/102 (2013.01); G06F 1/12 (2013.01); G06F 9/45558 (2013.01); G06F 11/00 (2013.01); G06F 2009/45579 (2013.01); G06F 2009/45591 (2013.01)

(58) Field of Classification Search
None
See application file for complete search history.

(56) References Cited

U.S. PATENT DOCUMENTS

| 5,576,734 A * | 11/1996 | Daniele ................... G06F 3/023 341/22 |
| 7,007,188 B1 * | 2/2006 | Tischler .................... G06F 1/08 713/501 |
| 7,516,380 B2 * | 4/2009 | Kanter ................... G01R 29/26 714/731 |
| 7,590,151 B2 | 9/2009 | Middleton et al. |
| 2006/0002324 A1 * | 1/2006 | Babbar ............... H04L 29/1232 370/325 |
| 2009/0222685 A1 | 9/2009 | Foster et al. |
| 2010/0272102 A1 | 10/2010 | Kobayashi |

(Continued)

OTHER PUBLICATIONS

"Virtualized Testing," Solution Brief, 915-3072-01 Rev. B., Ixia, pp. 1-2 (May 2014).

(Continued)

*Primary Examiner* — Henry Tsai
*Assistant Examiner* — Juanito Borromeo
(74) *Attorney, Agent, or Firm* — Jenkins, Wilson, Taylor & Hunt, P.A.

(57) ABSTRACT

Methods, systems, and computer readable media for providing precise timing in a virtual data network or storage network test environment are provided. One method includes providing at least one peripheral device or peripheral device emulator including a timing source. The method further includes connecting the at least one peripheral or peripheral device emulator to a peripheral interface of a computing platform hosting a hypervisor on which at least one test or application under test virtual machine executes. The method further includes making the timing source available to the at least one virtual machine. The method further includes executing a test and using the timing source to provide precise timing for the test.

15 Claims, 3 Drawing Sheets

(56) References Cited

U.S. PATENT DOCUMENTS

2014/0245069 A1\* 8/2014 Hu .......................... G06F 11/34
  714/38.1

OTHER PUBLICATIONS

"Converged Network Lifecycle Solutions," 915-0117-01 Rev K, Ixia, 48 pages (Oct. 2013).
"IxLoad," Solution Brief, 915-3030-01. D, Ixia, pp. 1-4 (Feb. 2012).
"Testing the Cloud: Definitions, Requirements, and Solutions," White Paper, 915-2950-01 Rev A, Ixia, pp. 1-18 (Aug. 2011).
"Good Timing Source," PBX in a Flash Forum, http://pbxinaflash.com/community/index.php?threads/good-timing-source.4820/, pp. 1-3 (Copyright 2010-2013, Downloaded from the Internet Apr. 21, 2014).
"Specialty Tools," Sangoma, http://www.sangoma.com/accessories/specialty-tools/, pp. 1-2 (Publication Date Unknown, Downloaded from the Internet Apr. 21, 2014).

\* cited by examiner

METHODS, SYSTEMS, AND COMPUTER READABLE MEDIA FOR PROVIDING PRECISE TIMING IN VIRTUAL DATA NETWORK OR STORAGE NETWORK TEST ENVIRONMENT

TECHNICAL FIELD

The subject matter described herein relates to testing data storage and network equipment. More particularly, the subject matter described herein relates to methods, systems, and computer readable media for providing precise timing in a virtual data network or storage network test environment.

BACKGROUND

Network test systems test data network and storage network equipment by executing tests that measure latency, throughput, roundtrip time, jitter, and other metrics of device performance. All of these tests require precise timing and, in some instances, synchronized timing sources between the test system and the device(s) under test. When the test system is implemented on hardware dedicated to testing and the devices under test include precise timing sources, accurate timing measurements can be obtained from the tests. However, in many instances dedicated testing hardware is not available. For example, when testing data center equipment, physical access to the test environment may be limited. Instead, testing can be performed by loading test software onto data or storage network equipment physical machines. Because the data or storage network physical machines may not have reliable clocks, the test software may not have access to accurate, synchronized clock sources.

The difficulties in executing tests that require precise timing sources is further complicated by the introduction of virtualization in data network and storage network equipment. For example, applications under test in a data network or a storage network may run on top of hypervisor layers which virtualize the underlying physical hardware. In addition, applications under test may be moved among virtual machines after a test is initiated, which may further complicate timing measurements. Similarly, when the test application also runs on top of hypervisor, the test application may not have direct access to the underlying hardware, including clocks, and may also be moved among physical machines. Thus, even if the clock sources on some data network or storage network equipment are accurate, there is no way to guarantee on which physical machine a given application under test or test application will execute. As a result, virtualization increases the difficulty in obtaining accurate timing measurements during equipment testing.

One possible solution to this problem is to connect test equipment and equipment under test with synchronization cables. The clocks on all of the equipment could then be synchronized via signals transmitted over the synchronization cables. However, running synchronization cables throughout a facility is time consuming and may not be possible in the case where the tester does not have physical access to the test facility. Even when the tester has physical access to the facility, running synchronization cables may be difficult, especially when the test system and the system under test are located in different rooms and/or on different floors.

Accordingly, there exists a long felt need for methods, systems, and computer readable media for providing precise timing in a virtual data network or storage network test environment.

SUMMARY

Methods, systems, and computer readable media for providing precise timing in a virtual data network or storage network test environment are provided. One method includes providing at least one peripheral device or peripheral device emulator including a timing source. The method further includes connecting the at least one peripheral or peripheral device emulator to a peripheral port of a computing platform hosting a hypervisor on which at least one test or application under test virtual machine executes. The method further includes making the timing source available to the at least one virtual machine. The method further includes executing a test and using the timing source to provide precise timing for the test.

The subject matter described herein may be implemented in hardware alone or in combination with software and/or firmware. As such, the terms "function," "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
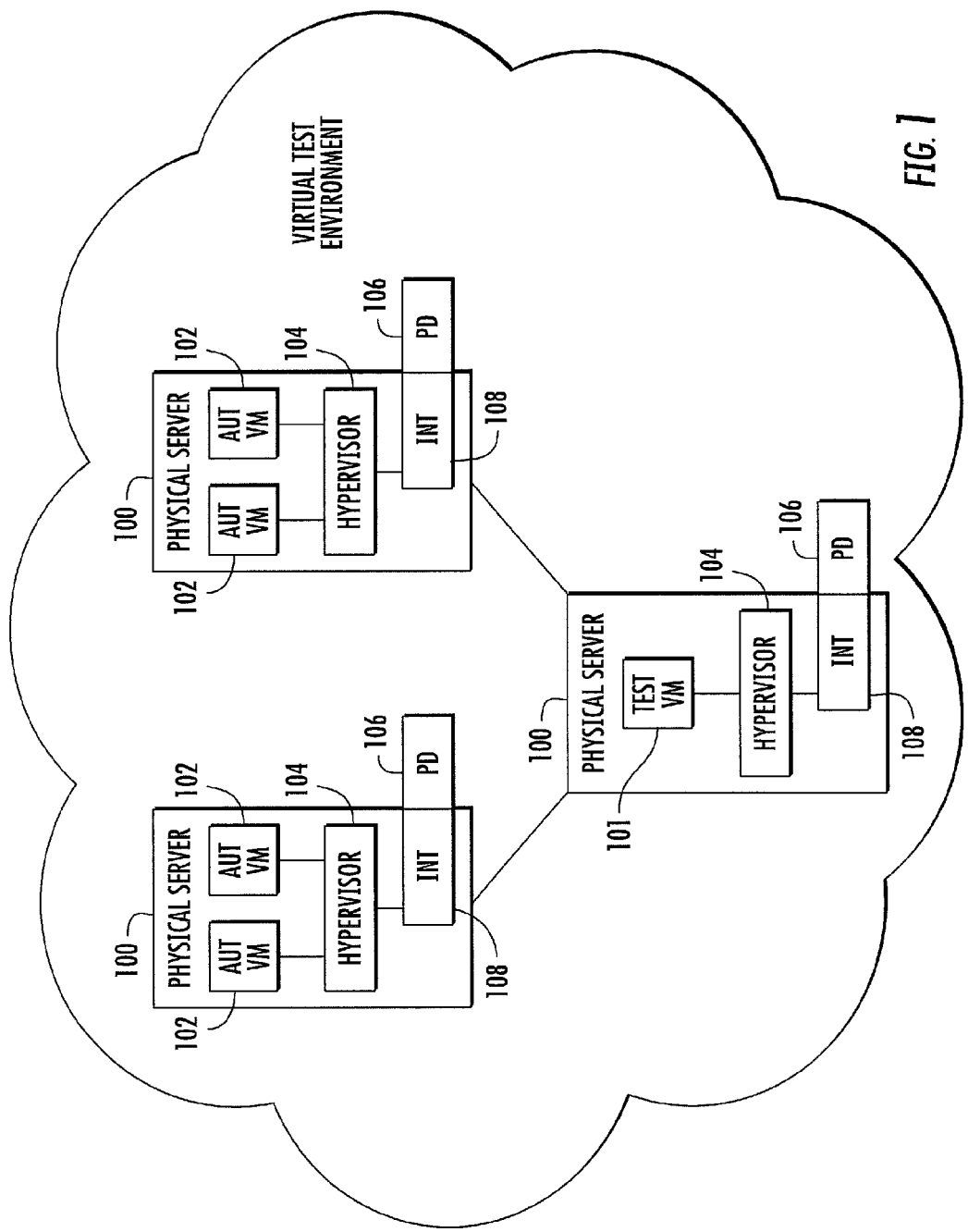
FIG. 1 is a block diagram illustrating an exemplary system for providing precise timing in a virtual data network or storage network test environment according to an embodiment of the subject matter described herein.

The subject matter described herein includes methods, systems, and computer readable media for providing precise timing in a virtual data network or storage network test environment according to an embodiment of the subject matter described herein. FIG. 1 is a block diagram illustrating an exemplary system for providing precise timing in a virtual data network or storage network test environment according to an embodiment of the subject matter described herein. Referring to FIG. 1, a plurality of physical servers 100 each support one or more test virtual machines 101 and/or application under test (AUT) virtual machines 102. Test virtual machines 101 may perform tests on data network or storage network equipment by sending packets to the equipment and measuring latency, throughput, jitter, packet inter-arrival time, packet round trip time, or other metric that requires a precise timing source. In one embodiment, test virtual machines 101 may include IxLoad™ virtual machines available from Ixia Communications. Application under test virtual machines 102 may be data network or storage network applications, such as file servers, web servers, network address translators, firewalls, etc.

Each physical server 100 may include hardware, such as a processor, memory, clock, and a hypervisor 104 that virtualizes the underlying hardware. Each hypervisor 104 may be implemented using any suitable virtualization software, such as the vSphere hypervisor available from VMWare, Inc. Because each physical server 100 may not have a precise timing source, a peripheral device (PD) or device emulator 106 may be connected to each physical server 100 via a peripheral interface (INT) 108. Each peripheral device or device emulator 106 may include a timing source that includes a precise clock or counter. In one embodiment, each peripheral device or device emulator 106 may be implemented using a universal serial bus (USB) device with an internal clock, power supply, and synchronization module for synchronizing with other peripheral devices or device emulators. In such an embodiment, each peripheral interface 108 may be a USB interface of its respective physical server 100. In an alternate embodiment, each device or device emulator 106 may emulate a keyboard, mouse, network interface card, printer, or other peripheral device so that each peripheral device or device emulator 106 can connect to each physical server 100 using a standard interface.

Once each peripheral device or device emulator 106 is connected to its respective physical server 100, each physical server 100, the AUT VMs 102, and test VMs 101 running on each physical server 100 will have access to a precise timing source. Each hypervisor 104 makes the timing source accessible to its respective virtual machines 101 and 102, via appropriate methods depending on how peripheral device or device emulator 106 is configured. For example, if the peripheral device or device emulator 106 is emulating a disk, hypervisor 104 may map access to it as a drive, allowing for the "stat" command to retrieve a dummy file timestamp, which would provide the current timestamp. Another method could be to map the emulation as a serial port, and receive the timestamp as incoming bytes. Another method, if peripheral device or device emulator 106 emulates a network adapter, network, and also a server, could be to run PTP (precision time protocol), between the VMs and the peripheral device or device emulator 106. Test virtual machines 101 and application under test virtual machines 102 may utilize the respective timing sources to timestamp packets, calculate timing metrics, such as latency, throughput, jitter, packet inter-arrival time, or packet roundtrip time, and start and stop tests at a precise and consistent time.

Figure 2:
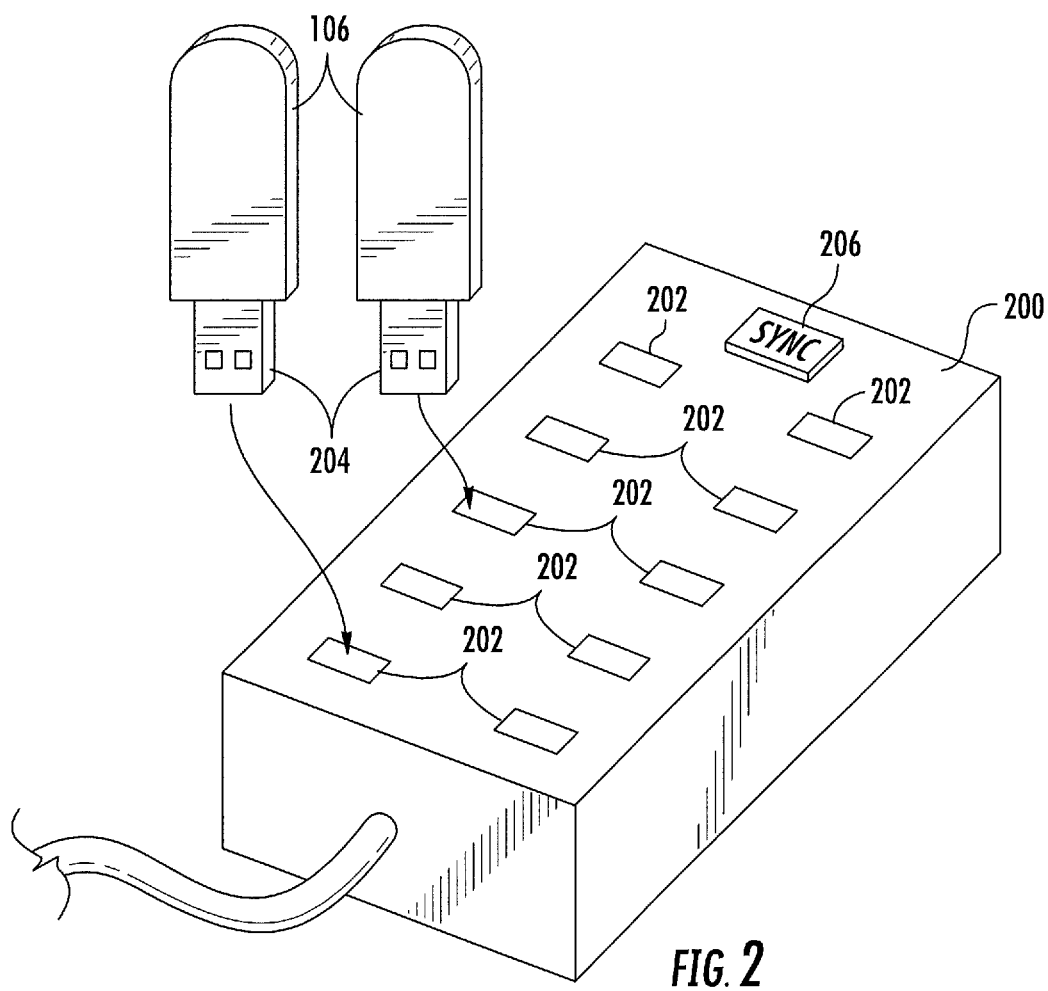
FIG. 2 is a block diagram illustrating a charging and synchronization module and a plurality of peripheral device or device emulators for providing precise timing sources for a virtual data network or storage network test environment according to an embodiment of the subject matter described herein.

According to another aspect of the subject matter described herein, timing sources associated with different peripheral devices or device emulators 106 may synchronize with each other before a test is initiated. In one embodiment, peripheral devices or device emulators 106 may initially be connected to a charging and synchronization module that charges the internal power sources and synchronizes devices 106 with each other prior to conducting a test. FIG. 2 illustrates such an example. In FIG. 2, a charging and synchronization module 200 includes a plurality of sockets 202 for receiving devices 106. In the illustrated example, each device 106 comprises a male USB connector 204, and sockets 202 comprise female USB connectors. When devices 106 are connected to sockets 202, and charging and synchronization module 200 is connected to an external power supply, the internal power supply in each device 106 may charge. In addition, charging and synchronization module 200 may synchronize devices 106 with each other by resetting the internal clock in each device 106 and starting the clocks together at the same time in response to user input. For example, charging and synchronization module 200 may include a synchronization button 206 that starts the clocks in all of devices 106 at the same time.

In one scenario, the user may synchronize the clocks of all of devices 106 just prior to removing devices 106 from charging and synchronization module 200 for a test. The user may then remove devices 106 from charging and synchronization module 200 and insert devices 106 into the physical machines that host applications under test and test applications. The user may then start the test. The test may include sending timestamped packets from the test applications to the applications under test. The applications under test may receive and process the packets, and, in some cases, return the packets to the test application. The test application may identify time of receipt of each packet. From the transmit timestamps in the packets and the time of receipt of each packet, timing measurements, such as latency, throughput, jitter, roundtrip time, and inter-arrival time, can be determined. Because the devices 106 include reliable timing sources that are synchronized with each other, these measurements will be more accurate than they would be if the internal clocks on the physical machines on which the applications under test or the test applications are located were used. This is especially true in a virtual environment where the physical server on which the test VM or application under test VM executes may change over time or may not be known in advance of a test.

Figure 3:
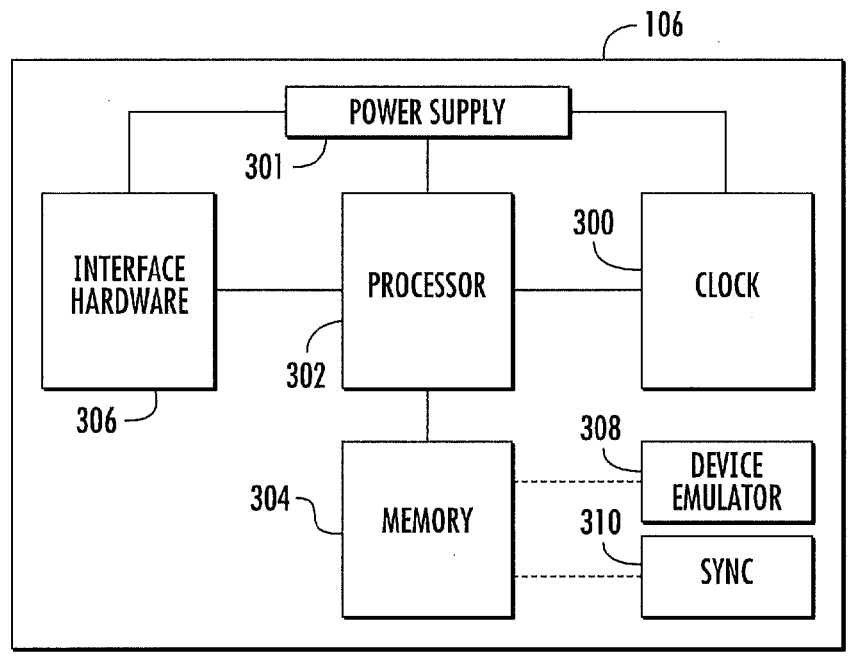
FIG. 3 is a block diagram illustrating an exemplary internal architecture for a device or device emulator for providing a precise timing source for a virtual data network or storage network test environment according to an embodiment of the subject matter described herein.

FIG. 3 is a block diagram illustrating an exemplary architecture for a device 106. Referring to FIG. 3, device 106 includes an internal clock 300 and a power supply 301. Internal clock 300 may be a high precision digital oscillator whose output is used to timestamp packets. Clock 300 may be the same clock used for timing by the remaining components of device 106. Alternatively, clock 300 may be dedicated clock used only to provide timing to an external device, such as computing platform on which device 106 executes. Power supply 301 is preferably a rechargeable energy source, such as a NiMH battery.

Device 106 may also include a processor 302, memory 304 and interface hardware 306. Processor 302 may execute instructions stored in memory 304 that facilitate peripheral device emulation, clock synchronization, and timestamp generation. For example, if device 106 emulates a peripheral device, memory 304 may include a device emulator 308 that emulates a keyboard, mouse, network interface card, USB drive or other peripheral device. Device emulator 308 may implement the protocol required to communicate with a host device over the interface being emulated. For example, if device 106 is or emulates a USB drive, device emulator 106 may generate the signals required to communicate with a host computer over a USB interface. Memory 304 may also include synchronization logic 310 for facilitating synchronization of clock 300 with clocks in other devices 106. For example, if clock 300 is a dedicated source, synchronization logic 310 may start clock 310 in response to an external stimulus, such as a start signal by charging and synchronization module 200. Interface hardware 306 may physically and electrically connect with physical servers 100 and other devices. For example, if device 106 is a USB device, interface hardware 306 may include USB compatible conductive pads to connect with the corresponding pads in a female USB socket. Both charging and communication may occur over interface hardware 306.

Figure 4:
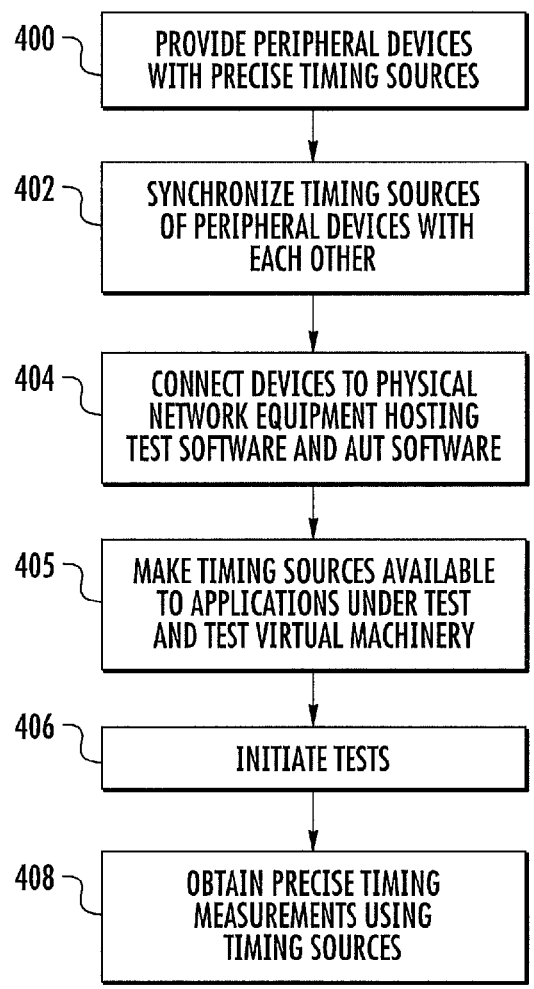
FIG. 4 is a flow chart illustrating an exemplary process for providing a precise timing source and for testing virtual data network and virtual storage network equipment according to an embodiment of the subject matter described herein.

FIG. 4 is a flow chart illustrating exemplary steps for using devices 106 to provide precise timing sources for testing in a virtual environment according to an embodiment of the subject matter described herein. Referring to FIG. 4, in step 400, a plurality of devices that include precise timing sources is provided. For example, devices 106 may be provided. In step 402, timing sources within the devices are synchronized with each other. For example, devices 106 may be connected to charging and synchronization module 200 and the timing sources within each device 106 may be initialized to start at the same time. In step 404, the devices are connected to physical network equipment on which virtual machines under test and test virtual machines are located. For example, devices 106 may be connected to standard peripheral interfaces, such as USB interfaces, printer interfaces, keyboard interfaces, network interfaces, or other of the physical machines.

In step 405, the timing sources are made available to the applications under test and the test virtual machines. For example, when a peripheral device or device emulator is connected to a physical server 100, and its respective clock 300 has been started, the values or signal generated by clock 300 may be communicated to physical servers 100 over hardware interface 106. The clock signal or values are made available by each hypervisor 104 to each application resident on the physical server. For example, hypervisor 104 may map the clock signal or values to the respected applications in the same manner that hypervisor 104 would make a clock residing on a physical machine accessible to software applications executing on the physical machine.

In step 406, a test is initiated. For example, a test virtual machine 101 may generate packets and send the packets to an application under test virtual machine 102. If the application under test virtual machine 102 is a firewall, the sending test virtual machine 101 or another test virtual machine 101 may receive packets that pass through the firewall and may record the time of receipt of the packets. In step 408, the precise timing values generated by the precise timing source are used to make precise timing measurements in the test. For example, the timing values may be used by test virtual machines to timestamp outgoing packets, record the time of receipt of incoming packets, start and stop tests on different physical machines at the same time, etc. Because the timing values output by devices 106 are precise and consistent with each other, the measurements derived from such values, such as latency, throughput, jitter, packet inter-arrival time, packet throughput, etc., will be accurate.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing precise timing in a virtual network test environment, the method comprising:
   providing at least first and second peripheral devices or peripheral device emulators, each including a timing source;
   synchronizing the timing sources of the first and second peripheral devices or peripheral device emulators with each other;
   connecting the first and second peripheral devices or peripheral device emulators to a peripheral interface of first and second computing platforms, respectively, hosting a hypervisor on which at least one test virtual machine or application under test virtual machine executes;
   making the synchronized timing sources available to the at least one test virtual machine or application under test virtual machine;
   synchronizing system clocks in the first and second computing platforms with each other by synchronizing the system clock of the first computing platform with the timing source of the first peripheral device or peripheral device emulator and synchronizing the system clock of the second computing platform with the timing source of the second peripheral device or peripheral device emulator; and
   executing a test and using the synchronized timing sources to provide precise timing for the test,
   wherein providing at least two peripheral devices or peripheral device emulators includes providing at least two universal serial bus (USB) devices that include an internal clock accessible by the hypervisor when connected to the at least one computing platform.

2. The method of claim 1 wherein the at least two USB devices include a synchronization module for synchronizing its internal clock with internal clocks of other USB devices.

3. The method of claim 1 wherein providing at least two peripheral devices or peripheral device emulators includes providing at least one keyboard emulator including an internal clock that is accessible by the hypervisor.

4. The method of claim 3 wherein the at least one keyboard emulator includes a synchronization module for synchronizing its internal clock with internal clocks of other keyboard emulators.

5. The method of claim 1 wherein providing at least two peripheral devices or peripheral device emulators includes providing at least one network interface card emulator that includes an internal clock accessible by the hypervisor.

6. The method of claim 1 wherein the test produces a timing metric associated with the at least one application under test virtual machine.

7. The method of claim 1 wherein the at least one application under test virtual machine performs a function associated with a data network or a storage network.

8. A system for providing precise timing in a virtual network test environment, the system comprising:
   at least one test virtual machine or application under test virtual machine for executing a test;
   at least first and second peripheral devices or peripheral device emulators that include a timing source, wherein the at least first and second peripheral devices or peripheral device emulators are configured to connect to a peripheral interface of first and second computing platforms, respectively, hosting a hypervisor on which the at least one test virtual machine or application under test virtual machine executes, wherein each timing source is mapped to a respective virtual machine; and at least one timing synchronization module for synchronizing the timing sources of the peripheral device or peripheral device emulators with each other;

wherein system clocks in the first and second computing platforms are synchronized with each other by synchronizing the system clock of the first computing platform with the timing source of the first peripheral device or peripheral device emulator and synchronizing the system clock of the second computing platform with the timing source of the second peripheral device or peripheral device emulator wherein the at least one test virtual machine or application under test virtual machine executes the test and uses the synchronized timing sources to provide precise timing for the test, and wherein the at least two peripheral devices or peripheral device emulators comprise at least two universal serial bus (USB) devices that include an internal clock accessible by the hypervisor when connected to the computing platform.

9. The system of claim 8 wherein the at least two USB devices comprise a synchronization module for synchronizing its internal clock with internal clocks of other USB drives.

10. The system of claim 8 wherein the at least two peripheral devices or peripheral device emulators comprise at least one keyboard emulator including an internal clock that is accessible by the hypervisor.

11. The system of claim 10 wherein the at least one keyboard emulator comprises a synchronization module for synchronizing its internal clock with internal clocks of other keyboard emulators.

12. The system of claim 8 wherein the at least peripheral devices or peripheral device emulators comprise at least one network interface card emulator that includes an internal clock accessible by the hypervisor.

13. The system of claim 8 wherein the test produces a timing metric associated with the at least one application under test virtual machine.

14. The system of claim 8 wherein the at least one application under test virtual machine performs a function associated with a data network or a storage network.

15. A non-transitory computer readable medium having stored thereon executable instructions that when executed by the processor of a computer control the computer to perform steps comprising:

synchronizing a timing source of at least first and second peripheral devices or peripheral device emulators;

initializing the synchronized timing source provided by first and second peripheral devices or peripheral device emulators which are connected to a peripheral interface of first and second computing platforms;

making the synchronized timing source available to at least one test virtual machine or application under test virtual machine;

synchronizing system clocks in the first and second computing platforms with each other by synchronizing the system clock of the first computing platform with the timing source of the first peripheral device or peripheral device emulator and synchronizing the system clock of the second computing platform with the timing source of the second peripheral device or peripheral device emulator;

executing a test using the test virtual machine to test data network or storage network equipment; and during the test, accessing the synchronized timing source to provide precise timing for the test, wherein the at least two peripheral devices or peripheral device emulators comprise at least two universal serial bus (USB) devices that include an internal clock accessible by the hypervisor when connected to the computing platform.

* * * * *